United States Patent [19]

Coppa et al.

[11] 4,269,558
[45] May 26, 1981

[54] APPARATUS FOR INTRODUCING A FUEL ELEMENT INTO A FUEL ASSEMBLY OF A NUCLEAR REACTOR

[75] Inventors: Louis Coppa, Boulogne; Jacques Lévy, Paris, both of France

[73] Assignee: Commissariat a l'Energie Atomique, Paris, France

[21] Appl. No.: 62,011

[22] Filed: Jul. 30, 1979

[30] Foreign Application Priority Data

Aug. 8, 1978 [FR] France .................................. 78 23375

[51] Int. Cl.³ ............................................. G21C 19/00
[52] U.S. Cl. .................................. 414/146; 294/86 A; 176/30
[58] Field of Search .................. 414/146, 745; 29/723; 294/86 A, 86.28, 86.3, 86.32, 100; 176/29, 30, 33, 36 R, 36 C, 12, 15, 86 R

[56] References Cited

U.S. PATENT DOCUMENTS

| | | | |
|---|---|---|---|
| 3,604,746 | 9/1971 | Notari | 294/86.32 |
| 3,905,634 | 9/1975 | Johnson et al. | 294/86 A |
| 4,192,715 | 3/1980 | Koshkin et al. | 176/30 |

Primary Examiner—Joseph E. Valenza
Attorney, Agent, or Firm—Kerkam, Stowell, Kondracki & Clarke

[57] ABSTRACT

Apparatus for introducing a fuel element into a fuel assembly is constituted by a plurality of vertical fuel elements and a structure for fixing said fuel elements, whereby the fuel elements have a positioning given by the fuel assembly and has an introduction plate fixed to the upper face of the fuel assembly. The plate has a plurality of orifices for the passage of a fuel element, the orifices positioning the fuel elements in the fuel assembly. A tool grips a fuel element for introduction thereof into a fuel assembly. Lifting means moves the tool in horizontal displacements between a storage rack for the fuel elements and one of the orifices of the introduction plate.

5 Claims, 12 Drawing Figures

APPARATUS FOR INTRODUCING A FUEL ELEMENT INTO A FUEL ASSEMBLY OF A NUCLEAR REACTOR

BACKGROUND OF THE INVENTION

The present invention relates to an apparatus for reinstalling a fuel element in a fuel assembly of a nuclear reactor.

More specifically, the invention relates to an apparatus for reinstalling a fuel element in the fuel assembly of a water nuclear reactor in the case where the assembly is constituted by a system of rod-type vertical fuel elements held in place by a rigid structure essentially constituted by two respectively upper and lower end plates interconnected by ties parallel to the fuel rods, said ties joining to the structural assembly spacing grids which are parallel to the end plates and are disposed at several intermediate levels between the said end plates, these grids ensuring a flexible securing of the fuel elements or rods.

Even more specifically, the object of the present invention is an apparatus for a fuel assembly of the type in which the lower end plate can be disassembled due to the presence of screws or nuts joining the lower end plate to the lower end of the ties of the fuel assembly.

Such an assembly is already described and claimed in French Patent application EN No. 78 08282 filed on Mar. 22, 1978 by the present Applicant and entitled "Remotely assemblable and disassemblable fuel assembly". This earlier-dated application also describes the tool permitting the disassembly of the plate after turning over the fuel assembly. Obviously, disassembly takes place underwater in a storage pond.

Thus, the object of the apparatus for reinstalling fuel elements is to permit on the one hand the taking hold of a fuel element in a storage rack and on the other the introduction and guidance of the fuel element in the fuel assembly. During this operation, the introduction tool must permit a certain forcing when the fuel element traverses each spacing grid and the raising of the fuel element by a random height in the case of jamming in order to permit a further fuel element introduction operation.

To obtain all these functions, the apparatus for reinstalling the fuel element comprises on the one hand a guidance plate which is placed at the lower end of the fuel assembly and which is thus substituted for the lower end plate, said introduction plate being provided with orifices having the same configuration as the orifices in the spacing grid and on the other hand a tool which is able to grip the lower end (the fuel assembly being reversed) of an element, of the introduction thereof in its place into the fuel assembly and the exertion of a certain force on the fuel element in order to permit the passage through the spacing grids.

BRIEF SUMMARY OF THE INVENTION

The apparatus according to the present invention comprises:

an introduction plate which can be fixed to the upper face of the said fuel assembly and provided with a plurality of orifices able to permit the passage of a fuel element, said orifices reproducing the positioning of the fuel elements in the fuel assembly;

a tool for gripping a fuel element and for the introduction thereof into a fuel assembly;

lifting means able to give the tool horizontal displacements between a storage rack for the fuel elements and one of the positions vertical with respect to the orifices of the introduction plate;

the said tool comprising:

an outer tubular casing having at its lower end a bearing surface which can bear on the introduction plate, the bearing surface being provided with an axial bore and an abutment provided at the upper end thereof;

a system of jaws forming a clamp fixed to the lower end of a first control tube and able to slide in the casing;

means for controlling the opening and closing of said jaws;

a weight fixed to the first tube and able to slide in the casing and whose upper end constitutes an abutment able to cooperate with the upper abutment of the casing;

a supporting member fixed to the end of the first tube and which can be fixed to the lifting means;

a bar which can freely slide within the first tube between a first upper position and a second lower position, the upper end of said bar projecting beyond the supporting member to constitute a position indicator of the fuel element during the different operations, the lower end of the bar being able to pass through the orifice of the lower bearing surface of the casing;

first detachable means for linking in vertical translation the said bar and the said control means of the first tube; and second detachable means for linking in vertical translation said control means and the said casing.

Preferably, the control means for the jaws are constituted by a second tube surrounding the first tube, said second tube being terminated by a mandrel able to act on said jaws, and means linked in translation with the upper end of the second tube and able to bring about a limited relative displacement of the mandrel with respect to the jaws between an opening position of the jaws and a closing position thereof, said weight being fixed to the second tube and able to slide in the casing.

BRIEF DESCRIPTION OF THE DRAWINGS

The invention will be described in greater detail hereinafter with reference to a non-limitative embodiment and the attached drawings, wherein show.

DETAILED DESCRIPTION OF THE PREFERRED EMBODIMENTS

If reference is now made for example to FIGS. 6a and 6b it is clearly visible that the apparatus for reinstalling the fuel element (hereinafter called reinstalling apparatus) comprises an introduction plate A, a reinstalling tool B and a lifting and transfer means C.

The introduction plate A is substituted for the lower introduction plate of the fuel assembly in the manner described hereinbefore. This plate has fixing orifices $A_1$ at the lower end of ties $D_1$ of fuel assembly D, the latter being constituted by fuel elements or rods D'. Introduction plate A has guidance orifices $A_2$, whose positioning precisely reproduces that of the fuel elements D' in the fuel assembly. This plate has two functions, namely it serves as an abutment for the lower end of tool B during the introduction of a fuel element and on the other it serves to vertically guide the fuel element during installation until the latter has engaged in the first (not shown) spacing grid of the fuel assembly.

Tool B externally comprises a casing which is constituted in the upper part by a cylindrical casing 2 and which is extended at its lower end by a reduced diameter hollow cylindrical needle 4. In its lower part, hollow needle 4 is terminated by a plug 6 perforated by an axial orifice 6a and defines a lower bearing surface 6b which abuts against the introduction plate A and an upper bearing surface 6c within needle 4.

The assembly constituted by casing 2 and needle 4 contains means for gripping the head of the element and a push button position indicator means. The gripping means comprises jaws 8a of conventional type disposed at the lower end of a hollow rod or control tube 8b. On their upper outer face, the jaws have a conical ramp 8c. There is also a mandrel 10a which surrounds the upper part of jaws 8a and is mounted at the lower end of a second hollow rod or control tube 10b surrounding the control rod 8b. It is readily apparent that by bringing about a slight lowering movement of rod 10b with respect to rod 8b mandrel 10a acts on the ramps 8c of jaws 8a and brings about the moving together thereof, which ensures the locking of the clamp on the head of the fuel element.

Figure 1:
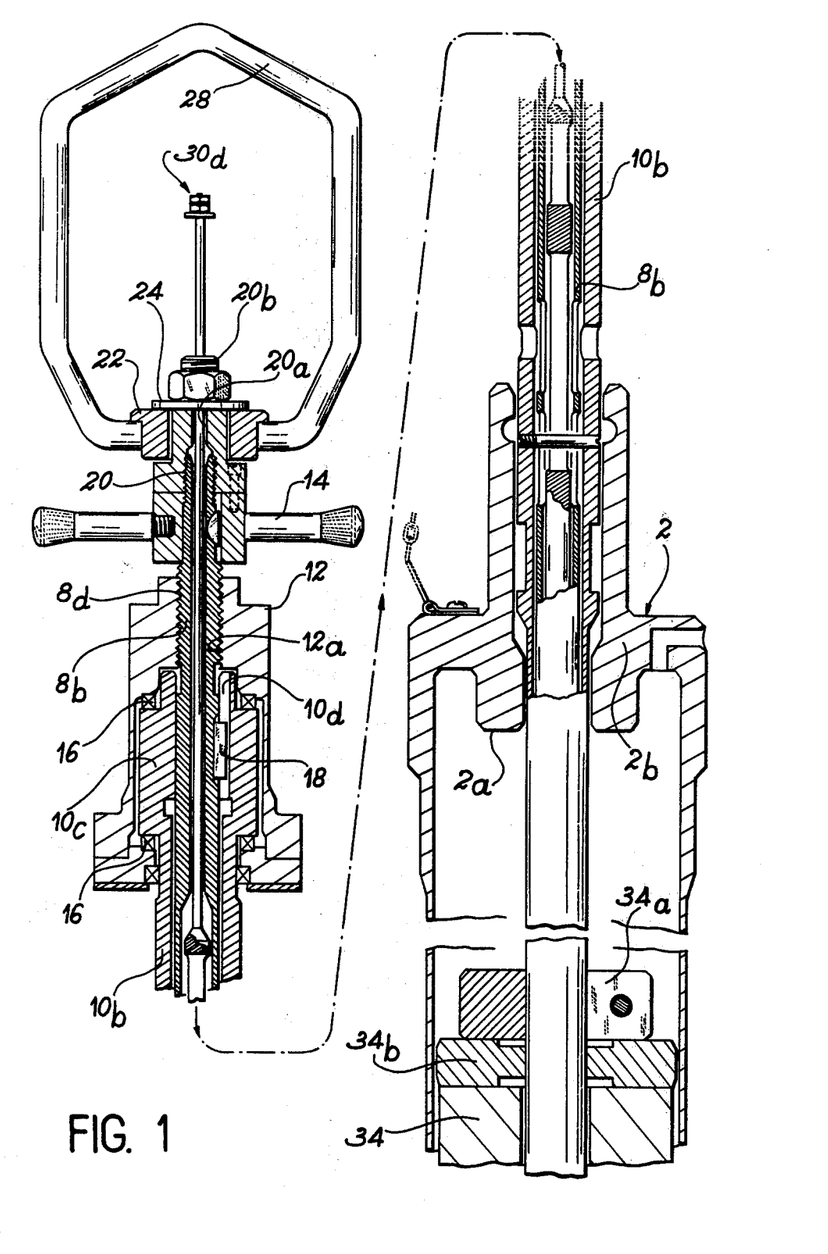
FIGS. 1 and 2 vertical sectional views respectively of the upper part and the lower part of the tool for reinstalling the fuel element.

This relative movement is obtained as a result of the presence of a control box 12 and an operating handle 14, which are visible in the half-view from the left of FIG. 1. The upper end 10c of rod 10b, which has a larger diameter than the remainder of said rod is immobilised in translation with respect to control box 12, but is free in rotation with respect to the latter. This result is obtained in known manner by means of thrust bearings such as 16. Rod 8b is extended beyond end 10c of rod 10b. It has a threaded portion 8d which cooperates with a tapped bore 12a, which axially traverses the cover 12b of box 12. Rod 8b is immobilised in rotation with respect to rod 10b by the cooperation of key 18 and the inner longitudinal groove 10d made in portion 10c of rod 10b. Beyond threaded portion 8d the upper end 8e of rod 8b is integral in rotation and in translation with a supporting member 20, provided with an operating handle 14. Member 20 has an axial bore 20a and is mounted in pivotal manner in a ring 22 via a washer 24 and a nut 26 screwed onto the threaded portion 20b of member 20. Ring 22 is itself provided with a supporting ring 28.

It is readily apparent that if the operator locks box 12 and operates the handle 14 in an unscrewing sense jaws 8a are opened and if a screwing movement is performed, these jaws are closed.

Figure 2:
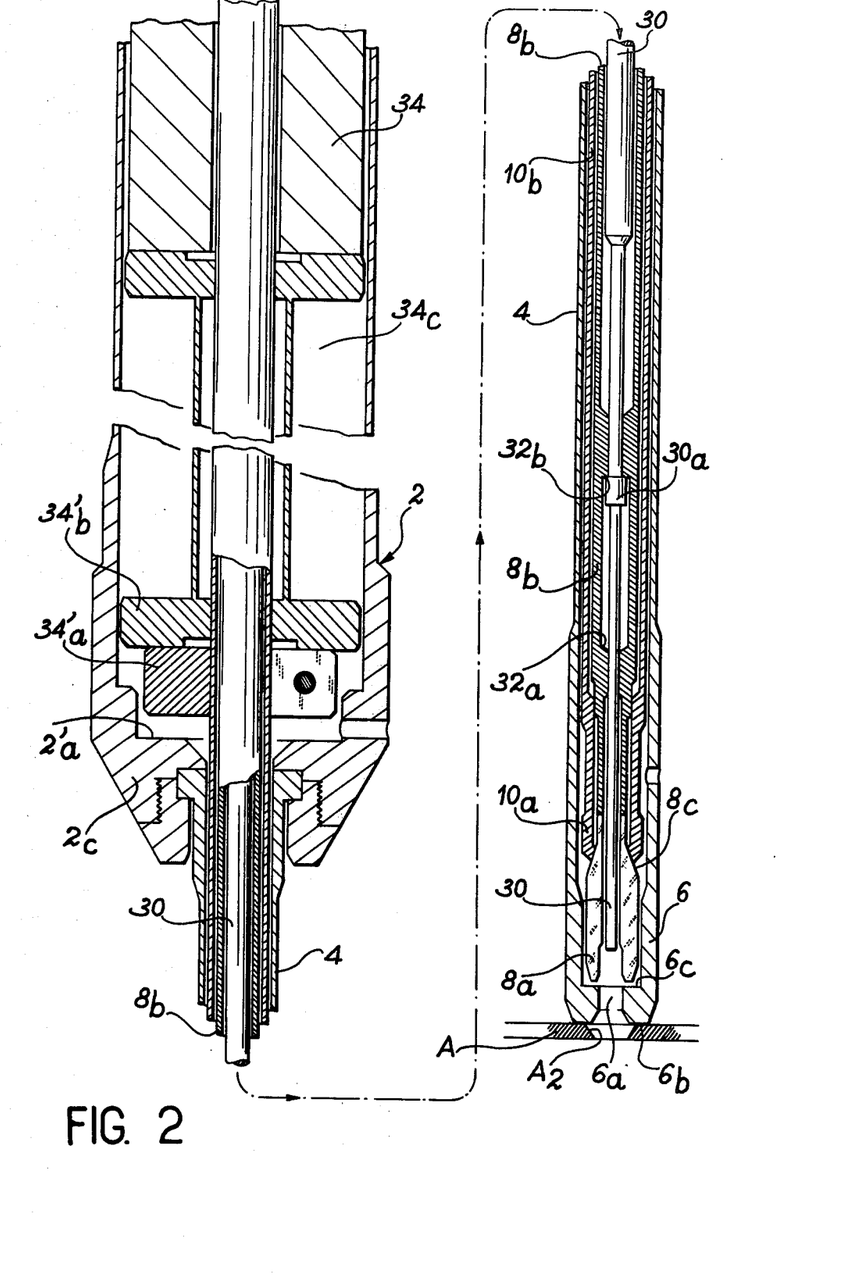
Figure 3:
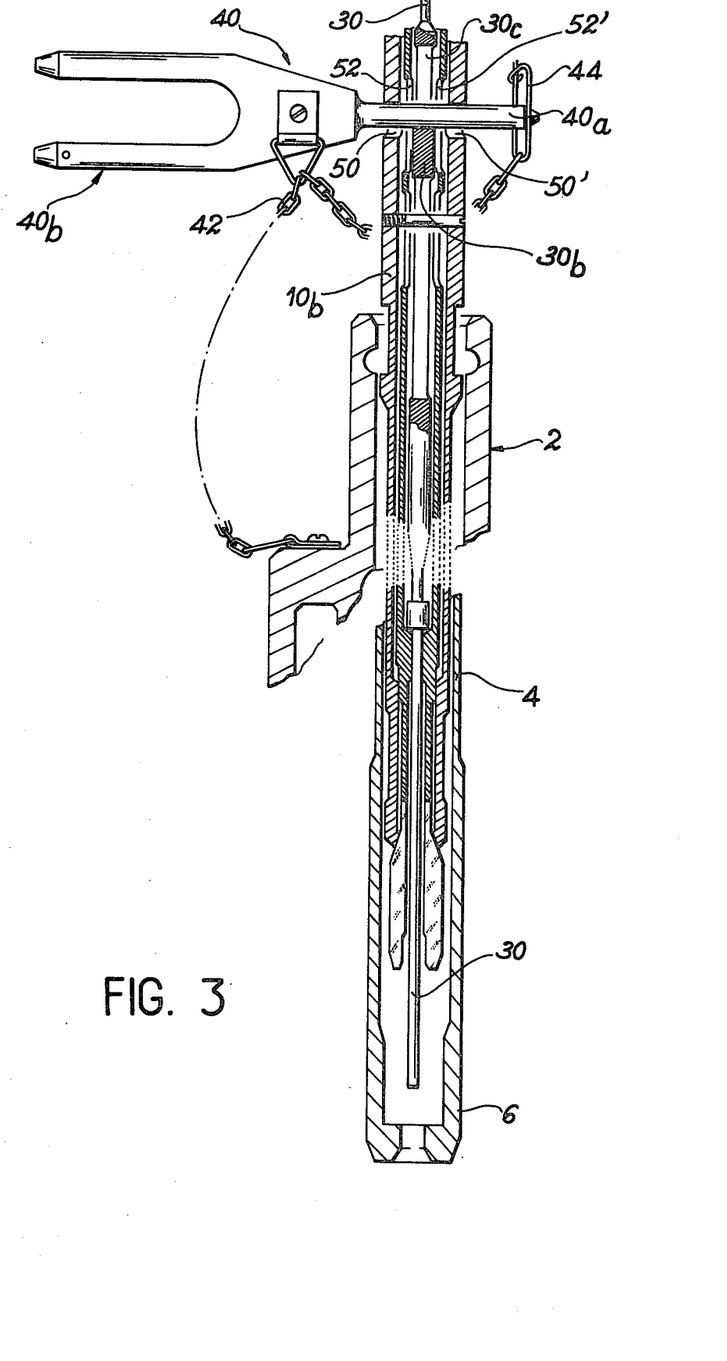
FIG. 3 is a vertical sectional view of the same tool in which the spindle has been fitted so as to permit the forced fitting of the fuel element in the fuel assembly.

As has been stated hereinbefore, the interior of rod 8b contains a level indicator push button means. It is constituted by a bar 30 which can be moved freely in translation within rod 8b. However, this translation movement is limited by two abutments 32a and 32b made within the rod 8b. These abutments can cooperate with a larger diameter portion 30a on bar 30. FIG. 2 shows bar 30 in the extreme upper position with respect to rod 8b. FIG. 3 shows bar 30 in the extreme lower position with respect to the hollow rod 8b.

As can be seen in FIGS. 1 and 2, hollow rod 10b is provided with weights 34 within the actual casing 2. These weights are fixed to rod 10b by means of split rings 34a and 34'a, guide disks 34b and 34'b and spacers 34c. The value of weight 34 and the position thereof have been regulated with respect to rod 10b. These weights serve to ensure the application of a clearly defined force so as to permit the introduction of a fuel element into the fuel assembly.

The reader will have noticed that on considering only the possibilities of displacing the main tool components in the vertical direction, the position is as follows.

Rod 8b and rod 10b with its weight 34 are substantially integral, with the exception of the possibilities of screwing and unscrewing, which corresponds to a very reduced travel. Bar 30 is free relative to rod 8b and therefore relative to rod 10b within the limits fixed by abutments 32a and 32b. Finally, the casing constituted by the true casing 2 and hollow needle 4 is free relative to rod 10b. The latter movement is only limited by the cooperation of weight 34 or (or more specifically by the split rings 34a and 34'a) with an abutment 2a made in the cover 2b of casing 2 and with an abutment 2'a constituted by the member 2c which connects casing 2 to needle 4.

Figures 4, 5:
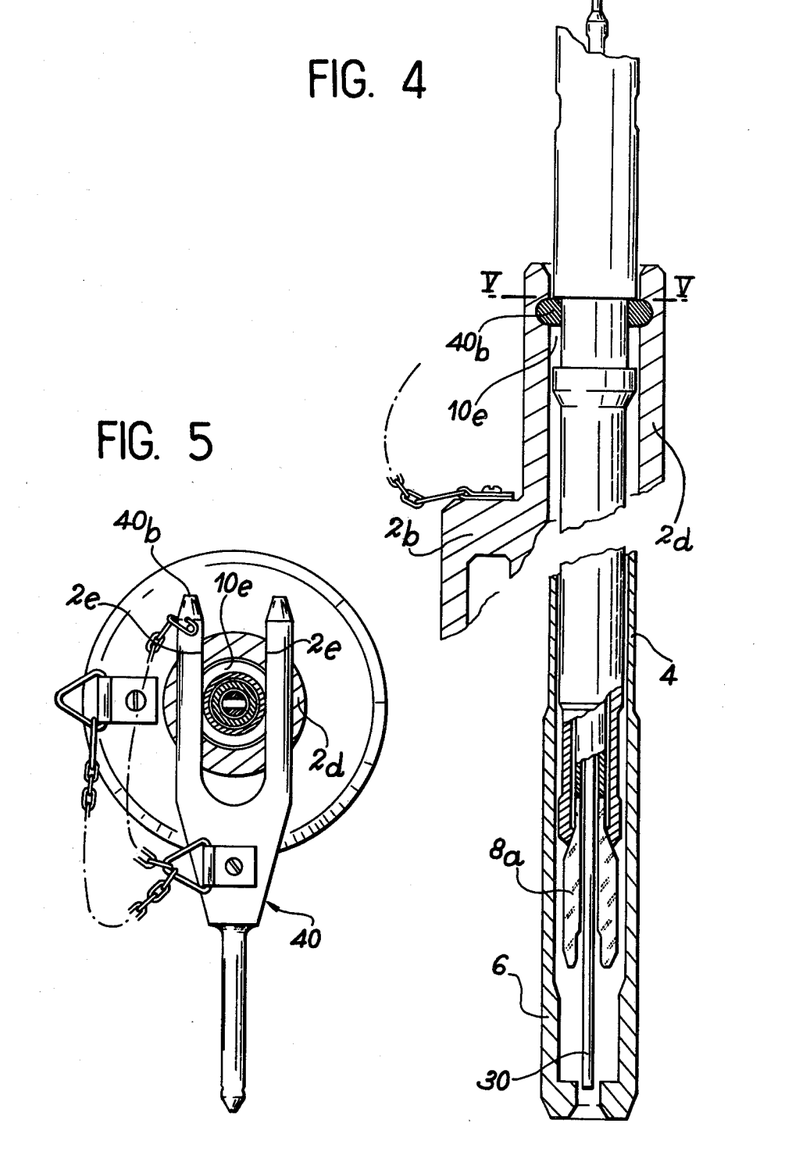
FIG. 4 a vertical sectional view of the same tool in which the spindle has been fitted so as to permit the transfer of the tool when the latter does not grip a fuel element.
FIG. 5 a horizontal sectional view in accordance with plane V—V of FIG. 4 showing the way in which the spindle is introduced.

As will be seen in greater detail hereinafter during a use stage of the tool it is necessary to join the bar 30 with said weight 34 without the intervention of abutments 34a or 34'a and in another stage it is necessary to join casing 2 to the support member 20, i.e. to rod 8b without any intervention of abutment 2a. In order to effect these two immobilisations tool B has a spindle 40 (shown in FIGS. 3 and 5) which is connected for example by a chain 42 to tool B. This spindle has a first active end 40a in the form of a conventional spindle and a second active end 40b in the form of a fork. A pin 44 makes it possible to lock in position one or other of the active ends.

In order to permit the linking in translation of hollow rod 10b and bar 30, rod 10b has two diametrically opposite holes 50 and 50', whose dimensions are sufficiently large to permit the introduction of end 40a of spindle 40. In the same way, bar 30 has a larger diameter portion 30b provided with a kidney slot 30c which also permits the passage of end 40a of spindle 40. Obviously, openings 52 and 52', corresponding to holes 50 and 50' are provided in rod 8b.

The joining of casing 2 of rod 10b to weight 34 is brought about by means of end 40b of spindle 40. To this end, rod 10b has an annular groove 10e on its outer face. In the same way, cover 2b of casing 2 is extended by a sleeve 2d which has two orifices 2e, whose axes are perpendicular to the vertical axis of the tool. On introducing the ends 40b of spindle 40 into orifices 2e and into groove 10e, casing 2 and rod 10b are linked in vertical translation.

A description will now be provided of the various operations to be performed with tool B in order to permit the fitting of a fuel element and the extraction thereof from the storage rack.

Figure 6A:
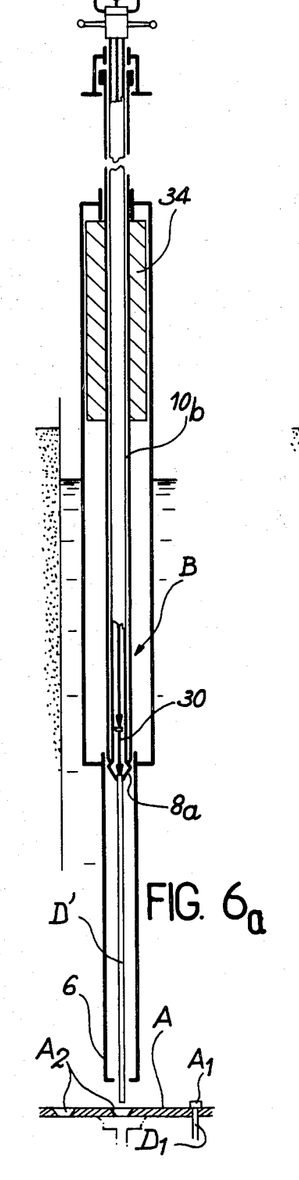
FIGS. 6a, 6b, 6c, 6d, 6e, 6f and 6g simplified views showing the positions of different parts of the tool during the different phases extending from the presentation of a fuel element above the fuel assembly to the extraction of a fuel element from the storage rack with a view to its introduction in the fuel assembly.

FIG. 6a shows the presentation of a fuel element D' above an orifice $A_2$ of the introduction plate A. In this position, jaws 8a are locked on fuel element D'. The weight is in contact with the abutment 2a of casing 2 (upper position) and no spindle is engaged, bar 30 being in contact with the fuel element. It should be noted that abutment 2a acts in such a way that fuel element D' projects slightly beyond orifice 6a of plug 6 of hollow needle 4.

Figures 6B, 6C:
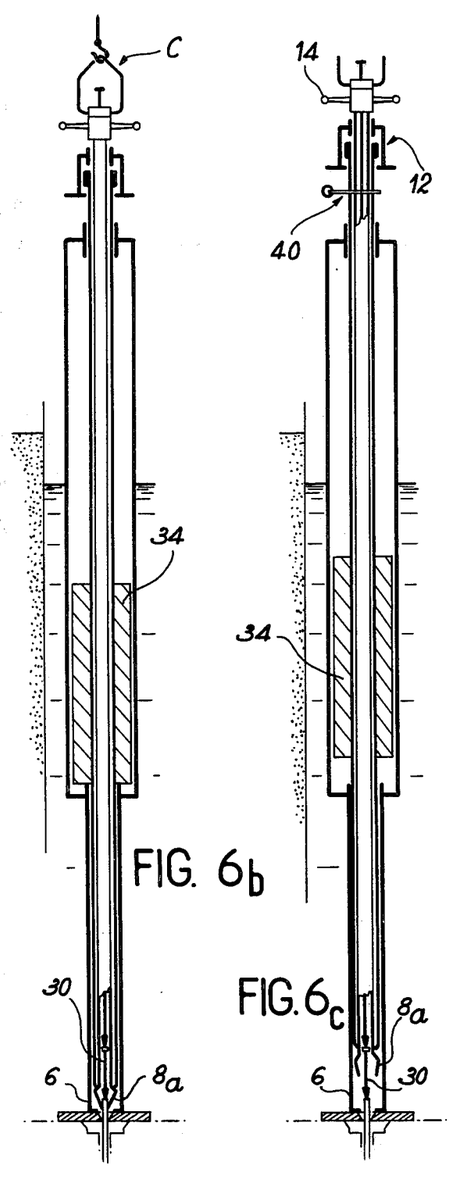

In the stage represented in FIG. 6b, the tool assembly is lowered by means of lifting means C. Thus, the lower bearing surface 6b of plug 6 of hollow needle 4 bears against introduction plate A and the lower end of jaws 8a bear against the inner surface 6c of plug 6 of hollow needle 4.

In the stage shown in FIG. 6c, jaws 8a are opened by an unscrewing action on control box 12 and operating handle 14. Rods 8b and 10b (with weight 34) are raised by lifting means C. During this phase, plug 6 of hollow needle 4 remains in engagement on introduction plate A and bar 30 remains in contact with the head of the fuel element. Rod 10b and consequently weight 34 are raised by a height such that orifices 50 and 50' of hollow rod 10b arrive in front of hole 30c of bar 30. End 40a of spindle 40 is then introduced. In this way, bar 30 and weight 34 are joined together and bar 30 projects into jaws 8a.

Figure 6D:
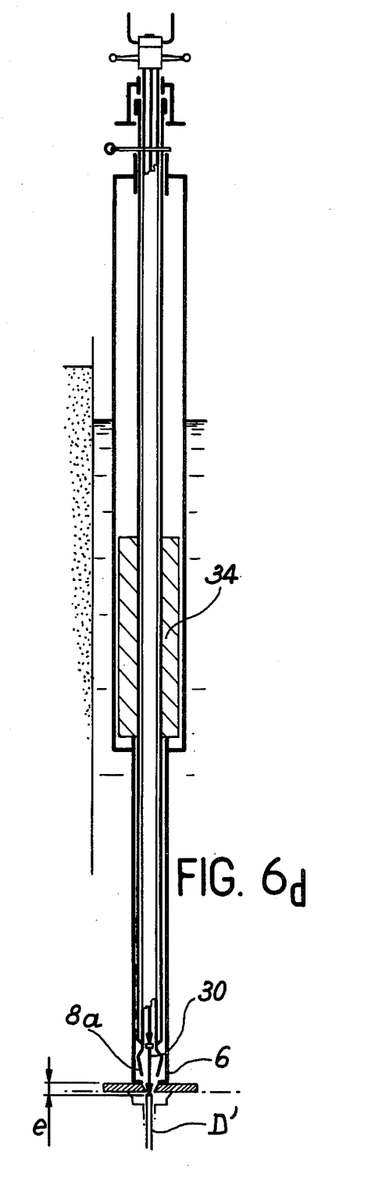

In the following stage shown in FIG. 6d, fuel element D' is introduced completely into the fuel assembly by lowering rod 10b and bar 30. Thus, the complete weight 34 is transmitted to fuel element D'. This lowering movement stops when the lower end of jaws 8a comes into contact with bearing surface 6c of hollow needle 4. Orifices 50 and 50' on the one hand and hole 30c on the other hand are positioned in such a way that when the said openings coincide, bar 30 projects out of jaws 8a by a length equal to the distance E between the upper face of plate A and the position of the fuel element head, when the fuel element is completely inserted in the fuel assembly.

Figure 6E:
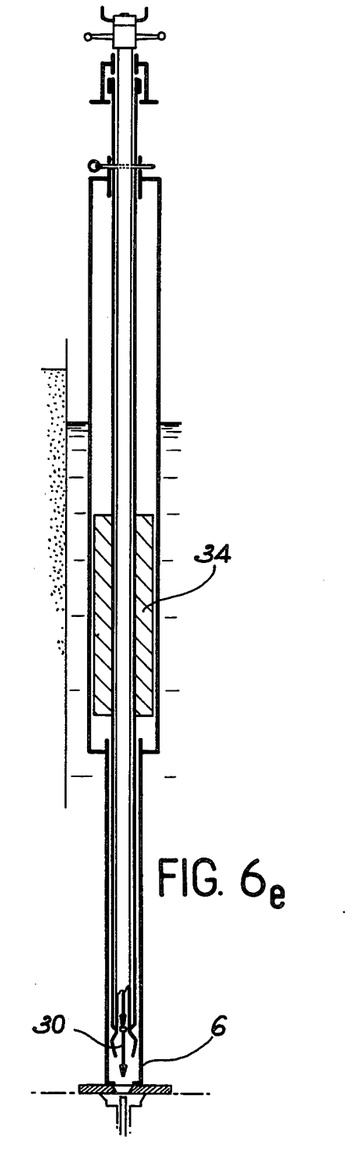
Figure 6F:
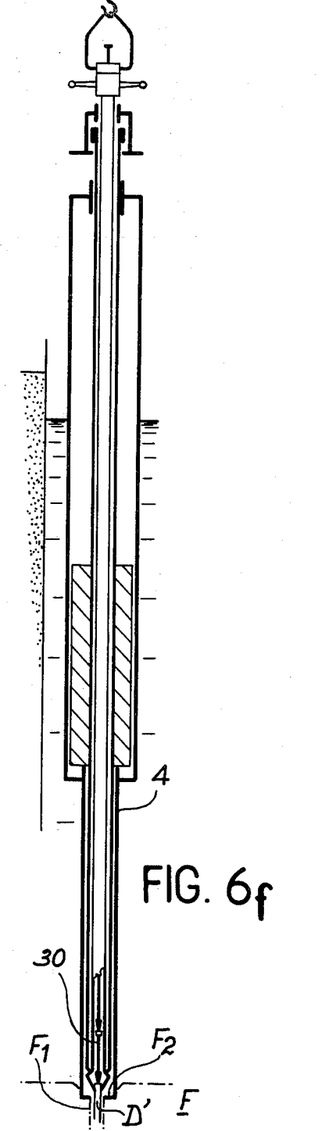
Figure 6G:
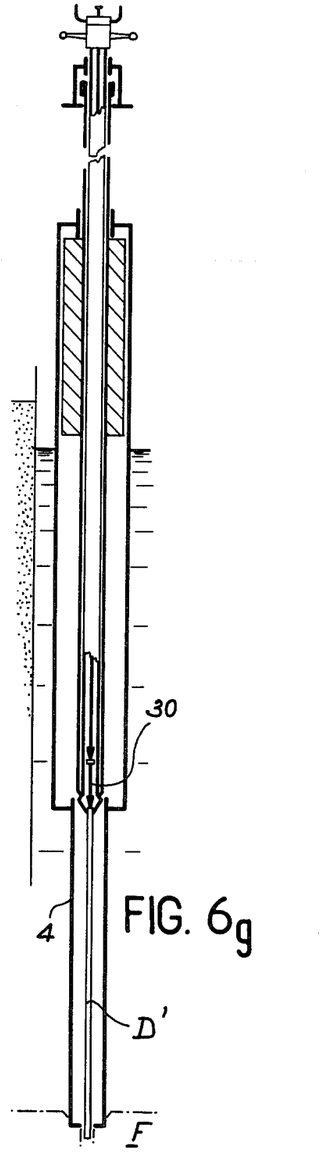

In a final stage shown in FIG. 6e, the movable parts of tool B come in positions corresponding to the transfer of the tool to the storage rack F for the fuel elements. For this purpose, end 40a of spindle 40 is removed and rod 10b is raised by a height such that holes 2e of casing 2 face the annular groove 10e of hollow rod 10b. The ends 40b of spindle 40 are then introduced into orifices 2e. It is apparent that in this way casing 2 and hollow needle 4 are joined to the supporting member 20 via rod 10b. Jaws 8a are then closed, as indicated hereinbefore. Lifting means C are then used to raise the assembly of the rods and bar of the tool until the split ring 34a abuts against the bearing surface 2a of casing 2. In this position, the fuel element projects slightly out of bore 6a, but most of said element is protected by hollow needle 4. The tool assembly B is then raised and is moved horizontally in order to bring it above an orifice $A_2$ of production plate A, thus returning to FIG. 6a.

The invention is not limited to the embodiments described and represented hereinbefore and various modifications can be made thereto without passing beyond the scope of the invention.

What is claimed is:

1. An apparatus for introducing a fuel element into a fuel assembly constituted by a plurality of vertical fuel elements and a structure for fixing said fuel elements, whereby the fuel elements have a positioning given by the fuel assembly, wherein it comprises:
    an introduction plate which can be fixed to the upper face of the said fuel assembly and provided with a plurality of orifices able to permit the passage of a fuel element, said orifices producing the positioning of the fuel elements in the fuel assembly;
    a tool for gripping a fuel element and for the introduction thereof into a fuel assembly;
    lifting means able to give the tool horizontal displacements between a storage rack for the fuel elements and one of the positions vertical with respect to the orifices of the introduction plate;
    the said tool comprising;
    an outer tubular casing having at its lower end a bearing surface which can bear on the introduction plate, the bearing surface being provided with an axial bore and an abutment provided at the upper end thereof;
    a system of jaws forming a clamp fixed to the lower end of a first control tube and able to slide in the casing;
    means for controlling the opening and closing of said jaws;
    a weight fixed to the first tube and able to slide in the casing and whose upper end constitutes an abutment able to cooperate with the upper abutment of the casing;
    a supporting member fixed to the end of the first tube and which can be fixed to the lifting means;
    a bar which can freely slide within the first tube between a first upper position and a second lower position, the upper end of said bar projecting beyond the supporting member to constitute a position indicator of the fuel element during the different operations, the lower end of the bar being able to pass through the orifice of the lower bearing surface of the casing;
    first detachable means for linking in vertical translation the said bar and the said control means of the first tube; and
    second detachable means for linking in vertical translation said control means and the said casing.

2. An apparatus according to claim 1, wherein the control means for the jaws are constituted by a second tube surrounding the first tube, said second tube being terminated by a mandrel able to act on said jaws, and means linked in translation with the upper end of the second tube and able to bring about a limited relative displacement of the mandrel with respect to the jaws between an opening position of the jaws and a closing position thereof, said weight being fixed to the second tube and able to slide in the casing.

3. An apparatus according to claim 2, wherein the first detachable means comprise two orifices made in the second rod and one orifice provided transversely in the bar, as well as a pin which can be introduced into the said orifices, the latter being disposed in such a way that when they coincide the lower end of the bar coincides with the position of the fuel element head when the fuel element is entirely inserted in the fuel assembly, whilst the jaws abut against an upwardly turned abutment provided on the lower part of the casing.

4. An apparatus according to claim 2, wherein the second detachable means comprise a pin having two branches, an annular groove made in the outer wall of the second tube and two orifices made in the upper part of the casing, said pin can be introduced into the orifices and into the groove, whereby the groove and orifices are arranged in such a way that when they face one another the lower end of the bar in the lower position is engaged in the bore of the lower bearing surface of the casing.

5. An apparatus according to claim 1, wherein the upper abutment of the casing and the upper end of the weight are disposed in such a way that when these two abutments are in contact, the distance between the jaws and the bore of the lower bearing surface of the casing is slightly less than the height of the fuel element.

* * * * *